United States Patent [19]

Smith et al.

[11] Patent Number: 4,485,485
[45] Date of Patent: Nov. 27, 1984

[54] CHARACTER READING CAMERA

[76] Inventors: Russell P. Smith, 21 Muritai Ter.;
Guy R. Dunlop, 157 Hamilton Ave.;
Carol L. Miles, 108 Leinster Rd., all
of Christchurch, New Zealand

[21] Appl. No.: 288,543

[22] Filed: Jul. 30, 1981

Related U.S. Application Data

[63] Continuation-in-part of Ser. No. 163,994, Jun. 30, 1980, abandoned.

[30] Foreign Application Priority Data

Jul. 2, 1979 [NZ] New Zealand .................. 190885

[51] Int. Cl.³ .............................................. G06K 9/00
[52] U.S. Cl. ...................................... 382/65; 235/436;
235/474; 382/67
[58] Field of Search ...................... 382/41, 44, 45, 48,
382/55, 58, 61, 65–69; 235/474, 436, 446, 454,
470; 358/264, 265, 285, 288; 250/208, 578

[56] References Cited

U.S. PATENT DOCUMENTS

| | | | |
|---|---|---|---|
| 3,200,373 | 8/1965 | Rabinow | 382/48 |
| 3,210,729 | 10/1965 | Lozier et al. | 382/41 |
| 3,588,818 | 6/1971 | Congleton et al. | 382/48 |
| 3,836,958 | 9/1974 | McMurtry | 382/65 |
| 4,143,355 | 3/1979 | MacIntyre | 235/474 |
| 4,219,736 | 8/1980 | Thibodeau | 382/67 |

*Primary Examiner*—Leo H. Boudreau
*Attorney, Agent, or Firm*—Holman & Stern

[57] ABSTRACT

The camera receives a line of light from an object plane containing the characters to be read together with light information indicative of scan motion at right angles to the line of received light. The two light information inputs are converted to electrical information in a common photo-sensor array which is usually an integral component of the camera. The character and scan electrical signals are preferably processed to drive a two-dimensional display device such as a plasma display panel, as part of a reading aid for the partially sighted.

In particularly preferred forms light indicative of character and scan information is conveyed to the photosensor array by optical fibre strips. Illumination of the information producing surfaces in the vicinity of the light receiving apertures is provided by optical fibre strips the output ends of which are laminated with the receiving apertures of the information conveying strips.

10 Claims, 11 Drawing Figures

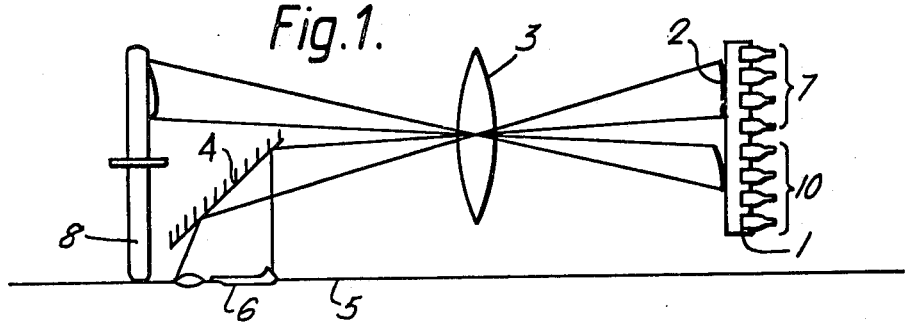
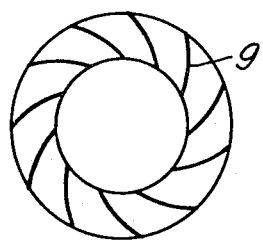
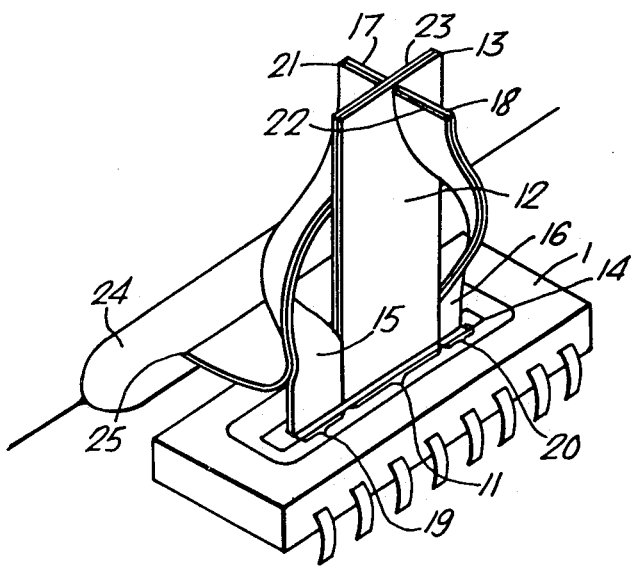
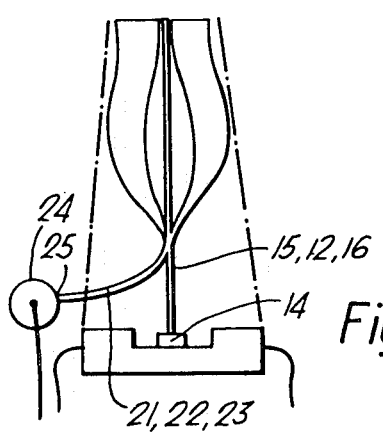

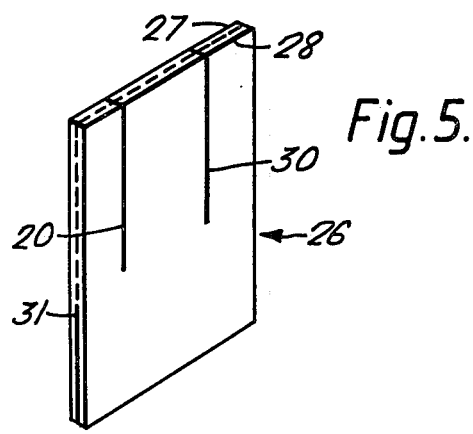
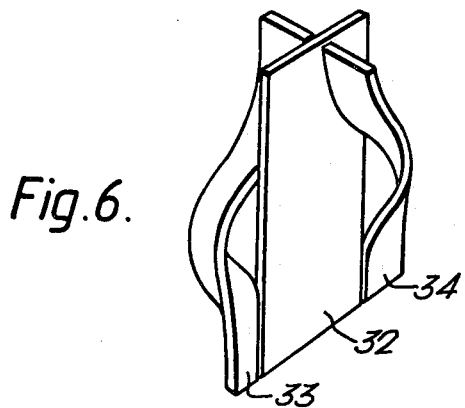
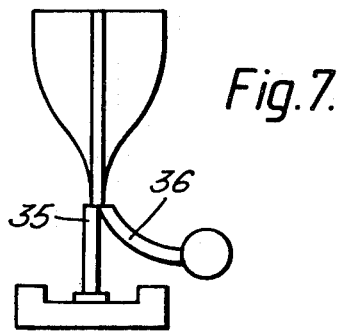
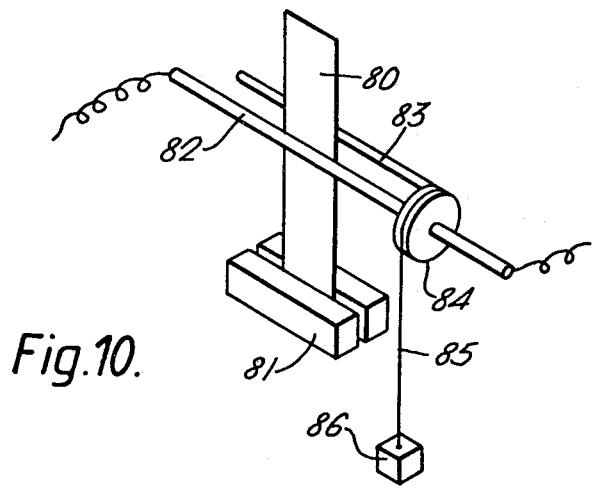
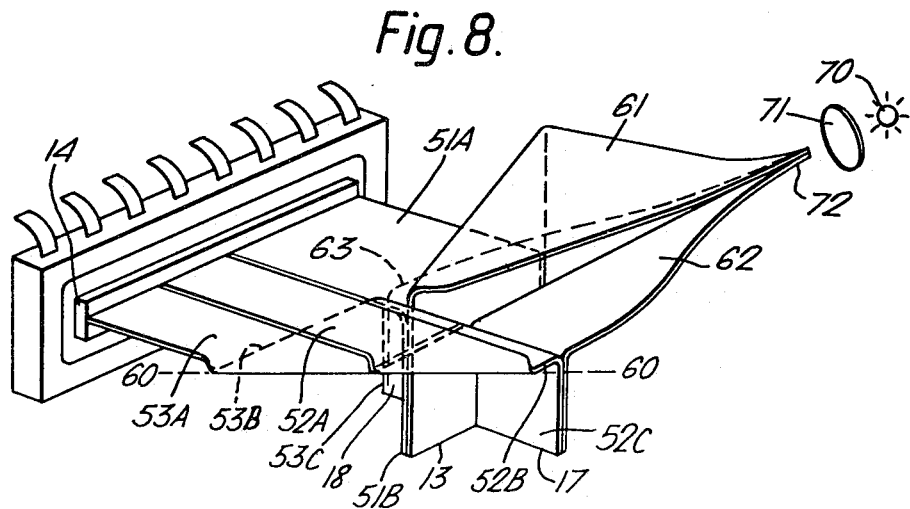

CHARACTER READING CAMERA

BACKGROUND OF THE INVENTION

This invention relates to a character reading camera which produces electrical signals representive of optical characters in an object plane scanned by the camera.

Character reading cameras are commonly used in character recognition systems where optical characters are scanned by a camera and the resulting electrical signals are processed to identify and record the characters and/or to display the scanned characters on a screen. Typical uses for such a character recognition system are in automatic signature readers and label reading in a computerised merchandising inventory control. Such cameras typically comprise a linear array of photo-sensors, an optical system which focuses a vertical slice of the character being read onto the photo-sensors and a wheel or roller driven pulse generator which engages with the surface on which the character is printed to produce pulses for each given scan distance increment. The electrical information from the photo-sensor array is stored for each scan increment and the total information obtained from the scanning of a character is compared with a series of prestored signals representing ideal characters.

A different type of application for a character reading camera, and one of particular interest in the present specification, is as a component in a reading aid for the partially sighted. Hitherto reading aids have essentially comprised a closed circuit television system where a page to be read is traversed by a television camera and a display screen reproduces in magnified form the characters scanned by the camera. Such systems are bulky and leave unsatisfied a vast need for a portable reading aid. An aid meeting this requirement can be produced using a character reading camera in conjunction with a digital store and a visual display unit. A reading aid of this type has been described in Browne, "A Reading Aid for the Partially sighted", *Electronics & Power*, August 1978, 592.

SUMMARY OF THE INVENTION

The object of the present invention is to provide a character reading camera having advantages over those at present known and with particular, but not sole, application in a reading aid for the partially sighted.

The invention consists in a character reading camera which produces electrical signals representative of optical characters in an object plane scanned by the camera. The essential elements of the invention are a multi-element photo-sensor array and first and second optical systems which supply light information to the array. The first optical system receives light from an object plane through a linear aperture having a length greater than character height and transmits the received line of light to a first group of photo-sensors in the array. The second optical system receives a changing linear pattern of light, the changes in which are a function of the relative scanning motion between the camera and the object plane in a direction at right angles to said linear aperture, and transmits this pattern to a second group of photo-sensors in the array. The electrical outputs of a particular arrangement of elements in the first group of photo-sensors each being representative of the intensity of light in adjacent segments of the line image, and the electrical outputs of the elements in the second group of photo-sensors conveying scan motion information.

BRIEF DESCRIPTION OF THE DRAWINGS

The preferred embodiments of the present invention will be described with reference to the accompanying drawings in which FIG. 1 shows diagrammatically the principles of operation of a first form of character reading camera, FIG. 2 shows a plan view of a scan wheel for the character reading camera of FIG. 1, FIG. 3 shows an isometric view of a second form of character reading camera, FIG. 4 shows a side elevation of the camera of FIG. 3, FIG. 5 shows a two layer flexible optical fibre blank cut preparatory to forming the optical transmission paths for the camera of FIG. 3, FIG. 6 shows an isometric view of one section of the optical fibre transmission paths using rigid optical fibre strips, FIG. 7 shows a side elevation of the camera optical transmission paths using rigid optical fibre strips, FIG. 8 shows an isometric view of a third form of camera also employing solid state optical systems, FIG. 10 shows an apparatus for bending the optical fibre strips forming the optical components of the third form of camera.

DETAILED DESCRIPTION OF THE PREFERRED EMBODIMENTS OF THE INVENTION

Figure 9:
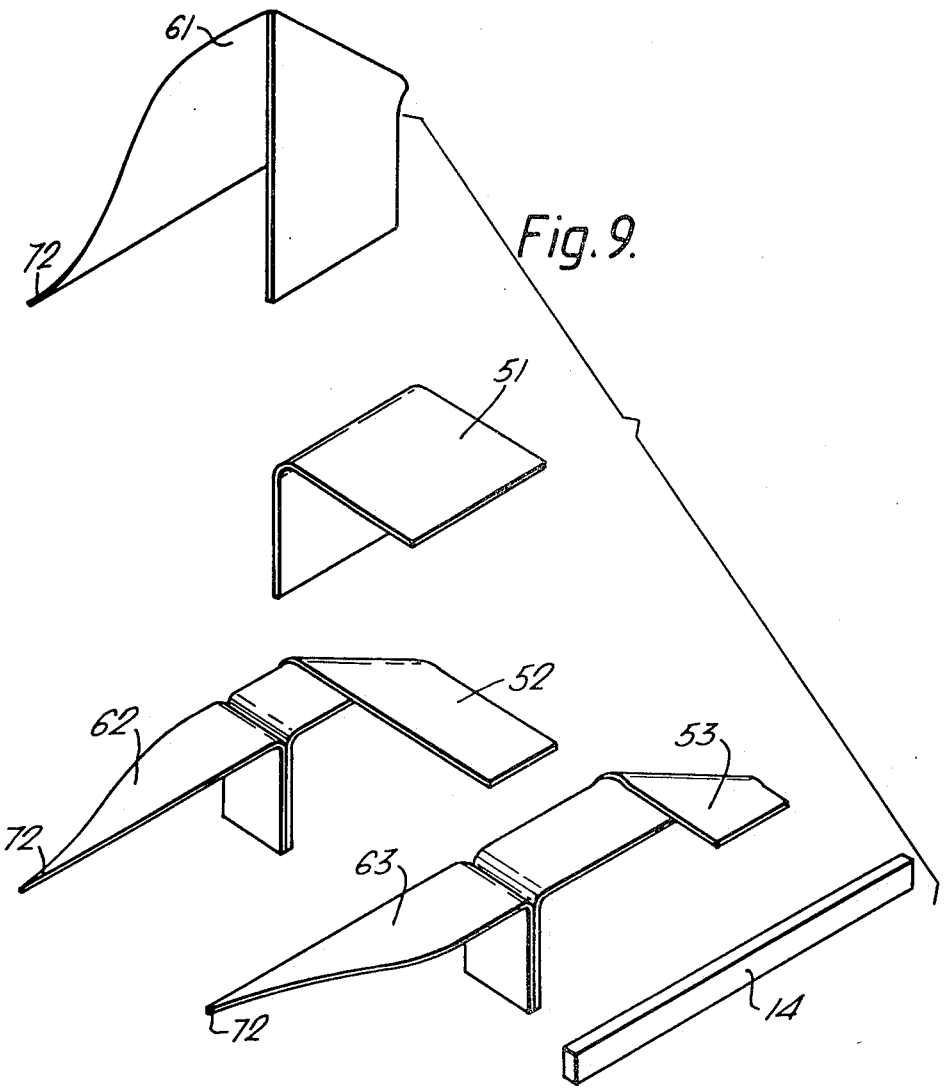
FIG. 9 shows an exploded view of the components of the optical fibre system of the third form of camera.

In a first embodiment of the invention an integrated linear array of photo-sensors 1 (FIG. 1) receives a line of optical information 2 via a lens 3 and a mirror 4 from an object plane 5. Light reflected from a character 6 on the object plane is admitted through a linear aperture (not shown) to mirror 4. At any one instant the optical image 2 represents a linear slice in the object plane having a length substantially equal to character height. The photosensors have a pitch of 0.001 inches thus breaking down the line of light into a number of segments of 0.001 inches spacing, each photo-diode having a conductive state determined by the intensity of light inpinging on it. The electrical output of the line of diodes in region 7 of the array thus corresponds to the optical image 2.

To form a two dimensional picture information in a direction at right angles to the linear slice in the object plane, that is, normal to the plane of figure, must be obtained and accordingly the camera is scanned in that direction with the changing optical image 2 being quantised in electrical processing circuitry (not shown) with the aid of pulses generated by a wheel or roller 8 fitted to the camera which revolves in contact directly or indirectly with the object plane as the camera is scanned. For example, the wheel may be arranged to generate a pulse for every 0.001 inch of camera movement to enable the electrical processing circuitry to store a line image every 0.001 inch of camera scan. The camera so far described is known but the means by which wheel 8 supplies the processing circuitry with scan information is believed to be new and will now be described.

On one flat surface of wheel 8 there is marked in a peripheral band a series of spiral curves 9 (FIG. 2). Light reflected from this band of curves is focused by lens 3 onto a second region 10 of the photo-sensor array 1. The spiral curves are marked in such a manner that the inner end of each curve lies on the same radial line as the outer end of the preceding curve. Light reflected from this band results in the image of a curve crossing region 10 of the array. Upon rotation of the wheel the images of successive spiral curves sweep down the photo-sensors to alter the conductive states of successive photo-sensors to produce electrical information representative of the motion of the camera. Consequently scanning information is provided to the processing circuitry in a similar form to the character information and from the same photo-sensor array.

In a second embodiment of the invention the camera is totally solid state. The optical system is formed by optical fibres and the scanning information is provided by sensing the passing of character edges or the image of character edges as they are scanned by the camera. One configuration by which the second form of the invention may be implemented is illustrated in FIG. 3. Again a single integrated linear photo-sensor array produces electrical states representative of both character information and scanning information. In this case the image a vertical slice of the character read is presented to a central region 11 of array 1 by an optical fibre strip 12 coupled at one end directly onto silicon chip 14. The opposite end (13) of strip 12 is held in contact with the character object plane and forms a linear optical aperture of length substantially equal to character height and oriented in use at right angles to the direction of camera scan. Scan motion information is provided to the sensor array 1 solely by optical means and these take the form of two additional optical fibre strips 15 and 16 one end (17,18) of each being located coplanar with and at right angles to aperture 13 of strip 12 to produce a second linear aperture aligned at right angles to the first. The opposite ends of strips 15 and 16 are directly coupled to outer regions 19 and 20 of the linear photo-sensor array 1. The ends of all optical fibre strips are ground flat and polished.

In use character edges scanned sweep along the length of aperture 17, 18 and the electrical states presented by the photo-sensor in regions 19 and 20 due to the changing patterns of light received through aperture 17,18 can be correlated in the processing circuitry to provide information on the camera scanning motion.

The camera apertures form a 0.25 inch square cross and feed a 512 element linear photo-sensor integrated circuit. Where the characters read are not required for subsequent display as they are in a reading aid for the partially sighted, lower character definition is adequate and the photo-senor array can have fewer elements. It will be appreciated that electronic character reading recognition is possible with less optical information than is required for a character display capable of assisting partially sighted persons.

Where the characters are on an opaque object plane such as paper, or in any situation where their optical significance is dependant on reflected light (as opposed to characters on a cathode ray tube screen for example), it is necessary to provide adequate illumination of the characters at least in the areas adjacent to apertures 13 and 17-18. In this second embodiment of the invention this is conveniently and elegantly achieved by providing a duplicate system of optical fibre strips laminated to the first with a light source coupled to one end and the opposite ends being located adjacent to the light receiving apertures. This duplicate system of optical fibre strips comprises strips 21, 22 and 23 distinguished from the first set of strips in FIG. 3 by the use of solid black edge lines. A suitable linear source of light is provided by a filament lamp 24 having a silvered surface with a clear slit 25 to which the ends of optical strips 21,22 and 23 are coupled (see also FIG. 4).

The construction illustrated in FIGS. 3 and 4 is intended to be formed by flexible optical fibre strips formed in turn from a two layer blank appropriately cut and bent into position prior to encapsulation (indicated by the dotted lines in FIG. 4). The blank is prepared as illustrated in FIG. 5 where the blank 26 comprising layers 27 and 28 is provided with two longitudinal cuts 29 and 30 to form a central portion which will finally result in strips 13 and 23 and two outer portions which will eventually result in strips 15 and 21 and 16 and 22. The two layers of strip 26 are separated along line 31 to provide connections to the photo-senor array 1 and lamp 24 respectively. The portions of strip 26 outside cuts 29 and 30 are bent rearward and forward respectively, and then twisted anticlockwise through 90° to result in the configuration shown in FIG. 3. The two layers are separated along length 31 of the laminate join and one layer is bent away through approximately 90° for connection to the source of illumination.

The flexible fibre strip (for example Multifibred Tape manufactured by Rank Optics UK) comprises a number of square 6×6 bundles of optical fibres cemented side by side to form a strip 0.0024 inches thick and typically, though not necessarily 0.25 inches in width. The composite strip may be easily cut along joins between the square bundles of optical fibres. As an alternative to having all the camera components remote from the processor and display unit as described, the photo-sensor array and lamp 24 can be located in the processor with only crossed apertures 13 and 17-18 and 23 and 21-22 forming a remote unit. The two units are then connected by a long length of flexible optical fibre strip with the fibres being segregated into bundles to provide added "cable" flexibility. The fibre bundles are segretated by the application of a suitable solvent to the strip.

The second embodiment of the invention may also be implemented by the use of rigid optical fibre strip as indicated in FIGS. 6 and 7. In this case the strip thickness is approximately 0.5 mm. The assembly in is in two main parts, an upper part shown in FIG. 6 which comprises three discrete rigid optical fibre strips 32, 33 and 34 formed in the required configuration by heating and bending and held adjacent to each other until encapsulation. The lower part of the assembly can be seen in FIG. 7 and this simply comprises a flat strip 35 to which is joined in laminar form at the end a curved strip 36, the upper part of the assembly being mounted on the join of strips 35 and 36 so as to bridge these two strips. Rigid optical fibre strip may be as manufactured by Gallileo or Colimated Holes, USA.

While the optical fibre system of the second embodiment of the invention has been described with reference to a particular geometric configuration, other configurations may satisfactorily supply optical information from two or more crossed apertures to a photo-sensor array which need not necessarily be a linear array. Further, the apertures need not form a symmetrical cross and may be off-set so as to form an asymmetrical cross or not intersect at all.

As an example of a different geometric configuration for the optical paths a further form of the invention will be described with reference to FIGS. 8 to 10. An optical fibre strip 50 is directly coupled to a silicon chip 14 which comprises a linear photo diode array. The optical fibre strip 50 is divided into three segements 51, 52 and 53. Segement 51 comprises 50% of the strip width and conveys character information in light form to the chip. Optical fibre strip 51 extends from the silicon chip 1 in a direction normal thereto as portion 51A and is bent through 90° to form the leg portion 51B which in use makes contact with the object plane. Segments 52 and 53 each comprising 25% of the optical fibre strip width form two halves of the optical system for scan information. Segment 52 extends from the silicon chip 1 as portion 52A initially in the same plane as segment 51 but by virtue of a fold along line 60—60 at 45° thereto is bent through an angle of 90° to lie in a plane parallel to portion 52A. This transverse portion 52B brings segment 52 to the centre line of segment 51 whereupon segment 52 is bent through a further right angle to form a leg portion which in use engages with the object plane and provides the first half 17 of the light receiving aperture for scan information.

The third segment 53 of the optical fibre strip also comprises a first portion 53A which runs parallel to segment 52 and folds along line 60—60 to provide a transverse leg 53B which takes segment 53 along segment 51 to the centre line of that segment, but on opposite side of that segment to segment 52. As with segment 52 segment 53 is bent through a right angle as portion 53C to produce the second half 18 of the scan information aperture in a common plane with apertures 13 and 17.

The above described geometrical configuration is preferred because the residual stress in the optical fibre strip is considerably reduced over that of the configuration illustrated in FIG. 3. The tight bends which occur in the optical fibres with the configuration illustrated in FIGS. 8 and 9 must be heat formed and the process for achieving this is illustrated diagrammatically in FIG. 10. Briefly, an optical fibre strip 80 is held in a clamp 81 so that it extends between components 82 and 83 of the bending jig. Component 82 which engages with the surface of the optical fibre strip consists of a stainless steel tube within which is contained a heating element to heat the optical fibre strip 80 along the desired bend line. Component 83 comprises a rod which engages with the strip 80 at a point slightly above element 82 and which in use applies a bending force about element 82 to the strip. Rod 83 is attached to the outer circumference of a reel 84 which is free to spin about the outside of stainless steel tube 82. A cord or other flexible tie 85 is wound around reel 84 and is fastened to a weight 86 which applies a constant bending force to the fibre strip. Current to heating element 82 need only be applied for a few seconds to achieve a tight bend.

Illumination of the object plane with this geometric configuration is provided by a substantially point source of light 70 (FIG. 8) and condensing lens 71 and fed into appropriate optical fibre paths which are bunched together at the light input end 72. The illumination paths are provided by three optical fibre strips 61, 62 and 63 which are laminated with legs 51B, 52C and 53C respectively of information conveying strips 51, 52 and 53. Thus illumination for character information aperture 13 is conveyed by fibre strip 61 and illumination for scan information aperture 17/18 is conveyed by fibre strips 62 and 63. The geometric configuration of the illumination strips is clear from FIG. 9 strip 61 is folded once about a 45° line and is contained in two parallel planes while strips 62 are bent through 90° and each contained in two mutually perpendicular planes.

Figure 11:
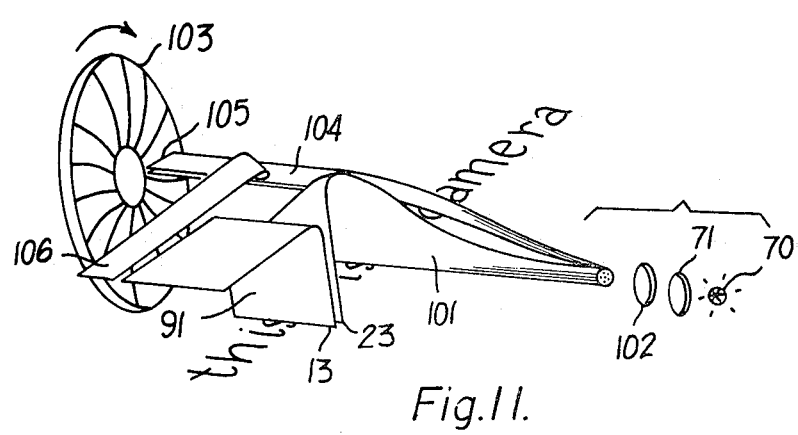
FIG. 11 shows an isometric view of a fourth form of camera employing optical fibre transmission paths, but using a wheel to provide scan information.

A fourth form of the invention shown in FIG. 11 combines some of the concepts of the forms shown in FIGS. 1 and 8. That is, a marked wheel which travels on the object plane provides optical scan information, but this is fed to the photodiode array through an optical fibre strip as is the character information. This arrangement has the virtues of simplicity of construction and easy decoding of scan information.

The character receiving aperture 13 of this form of camera is formed by one end of optical fibre strip 91 which corresponds to segment 51 shown in FIGS. 8 and 9. The opposite end of strip 91 directly couples to the greater part of a photodiode line array (not shown) in the manner described for other embodiments. The object plane is illuminated by a light source 70 the output of which is colliminated by lens 71 and directed into one end of optical fibre strip 107 for emission at aperture 23 adjacent receiving aperture 13. Strip 101 corresponds to segment 61 in FIGS. 8 and 9 and is likewise bunched at the light receiving end. An infra red filter 102 may be used to filter the illuminating light.

A spirally marked wheel 103 which corresponds to wheel 8 in FIGS. 1 and 2 is illuminated by an optical fibre strip 104 which is bunched at the receiving end with strip 101 to form an approximately 1 mm circle. Light reflected from wheel 100 is received by the end 105 of optical fibre strip 106 which is folded through 90° so that the opposite end is colinear with the light outlet end of character transmitting strip 91. Strip 106 is likewise directly coupled to the remaining portion of the photodiode array and corresponds to the light path between wheel 8 and region 10 of the array in FIG. 10.

The above description is given by way of example only and further embodiments of the invention and geometrical forms thereof will be apparent to persons skilled in the art.

What is claimed is:

1. A character reading camera which produces electrical signals representative of optical characters in an object plane scanned by the camera comprising:
   a multi-element photo-sensor array,
   a first optical system which receives light from said object plane through a linear aperture having a length substantially equal to at least character height and transmits the received line of light to a first group of photo-sensors in said array.
   and a said optical system which receives a changing linear pattern of light, the changes in which are a function of the relative scanning motion between the camera and the object plane in a direction at right angles to said linear aperture, and transmits said pattern to a second group of photo-sensors in said array, the electrical outputs of a particular arrangement of elements in the first group of photo-sensors each being representative of the intensity of light in adjacent segments of the received line of light, and the electrical outputs of the elements in the second group of photo-sensors conveying scan motion information.

2. A camera according to claim 1 wherein said changing linear pattern of light is generated by reflecting light off a surface of a rotatable disc mounted in a plane at right angles to said aperture and adapted to contact either directly or indirectly the character object plane in use, said disc surface being marked in an annular band with a series of spiral curves the inner ends of which lie on the same radial line as the outer end of the preceding curve in the band.

3. A camera according to claim 1 wherein said first optical system comprises a first bunch of optical fibres aggregated at at least one end to produce a narrow rectangular flat surface which forms said linear aperture, the other end of said fibres being physically coupled to said first group of photo-sensors in said array; and said second optical system comprises a second bunch of optical fibres aggregated at at least one end to produce a narrow rectangular flat surface which surface is arranged to form a second linear aperture oriented at right angles to the line of the first aperture, and the other end of said second bunch of optical fibres being physically coupled to said second group of photo-sensors in said array.

4. A camera according to claim 3 wherein said second bunch of optical fibres is divided into two groups, one respective end of each group being arranged with their longitudinal axes colinear on opposite sides of the linear aperture formed by the end of said first bunch of fibres to form said second linear aperture crossing at right angles through the center of the first aperture.

5. A camera according to claim 4 wherein three bunches of optical fibres, including said first and second bunches, are adjacent longitudinal segments of a common strip, two outer segments being separated from the strip and bent at right angles thereto on opposite sides of a central segment, the ends being arranged with the end of the central segment to form a right angled cross, and the opposite end of said common strip being physically coupled to a linear array of photosensors.

6. A camera according to claim 4 wherein three bunches of optical fibres, including said first and second bunches, are adjacent longitudinal segments of a common strip, said first segment being 50 percent of the strip width extending out from said array and then bent at right angles to be contained in two mutually perpendicular planes, the second and third segments being each 25 percent of the strip width extending out from said chip and then successively folded through at 180° and bent through 90° to be both contained in two parallel planes and a third plane perpendicular to said parallel planes, the portions of said second and third segments contained in said third plane being arranged on opposite sides of said first segment with the apertures formed by the ends of each segment lying in a common plane.

7. A camera according to claim 5 wherein a second strip of optical fibres is arranged in juxtaposition with the first strip to form a laminar bifurcated strip, the end of said second strip corresponding with the end of the first strip which is coupled to said photo-sensor being coupled to a linear source of light so as to provide illumination at the end of the second strip adjacent said linear apertures.

8. A camera according to claim 6 wherein a further three optical fibre strips are each laminated to a respective information carrying strip at the aperture end of said strips and bunched together at their opposite ends, and wherein a point source of light is coupled to said bunched opposite ends to provide illumination in the object plane adjacent said apertures.

9. A camera according to claim 2 wherein said first optical system comprises a first bunch of optical fibres aggregated at at least one end to produce a narrow rectangular flat surface which forms said linear aperture, the other end of said fibres being physically coupled to said first group of photo-sensors in said array; and said second optical system comprises a second bunch of optical fibres aggregated at at least one end to produce a narrow rectangular flat surface which surface is arranged to form a second linear aperture positioned so as to receive light reflected from said marked disc surface and the other end of said second bunch of optical fibres being physically coupled to said second group of photo-sensors in said array.

10. A camera according to claim 9 wherein said two bunches of optical fibres are configured as strips and a further two optical fibre strips are each laminated to a respective information carrying strip at the aperture end of said strips and bunched together at their opposite ends, and wherein a point source of light is coupled to said bunched opposite ends to provide illumination of the object plane and disc surface adjacent said light receiving apertures.

* * * * *